(12) United States Patent
Chen

(10) Patent No.: US 7,380,255 B2
(45) Date of Patent: May 27, 2008

(54) DISC POSITIONING STRUCTURE

(75) Inventor: Jeng-Jiun Chen, Taipei (TW)

(73) Assignee: Lite-On It Corporation, Taipei (TW)

( * ) Notice: Subject to any disclaimer, the term of this patent is extended or adjusted under 35 U.S.C. 154(b) by 284 days.

(21) Appl. No.: 11/163,399

(22) Filed: Oct. 18, 2005

(65) Prior Publication Data
US 2007/0033604 A1  Feb. 8, 2007

(30) Foreign Application Priority Data
Aug. 3, 2005  (TW) .............................. 94126317 A

(51) Int. Cl.
*G11B 17/028* (2006.01)
(52) U.S. Cl. .................................................. 720/703
(58) Field of Classification Search ............ 360/98.08, 360/99.05, 99.12; 720/703, 712, 714
See application file for complete search history.

(56) References Cited

U.S. PATENT DOCUMENTS 4,737,948 A * 4/1988 Okita ......................... 720/712
4,841,518 A * 6/1989 Nozu et al. .................. 720/714
6,741,418 B2 * 5/2004 Renken .................... 360/98.08
2002/0034041 A1 * 3/2002 Luo et al. ................. 360/99.12
2005/0174684 A1 * 8/2005 Hanssen .................. 360/99.12

* cited by examiner

*Primary Examiner*—Tianjie Chen
(74) *Attorney, Agent, or Firm*—Jianq Chyun IP Office

(57) ABSTRACT

A disc positioning structure includes a driver, a turntable and a positioning element. The turntable is disposed on the driver and used for placing a disc driven by the driver. The positioning element is disposed on the turntable and the disc is clamped onto the positioning element. The positioning element includes a first ring, a second ring and a plurality of spokes. Wherein, the second ring resides inside the first ring while the spokes are connected between the first ring and the second ring. The disc positioning structure provided by the present invention is able to compensate the positioning error of the disc and to reduce the production cost.

7 Claims, 5 Drawing Sheets

DISC POSITIONING STRUCTURE

CROSS-REFERENCE TO RELATED APPLICATION

This application claims the priority benefit of Taiwan application serial no. 94126317, filed on Aug. 3, 2005. All disclosure of the Taiwan application is incorporated herein by reference.

BACKGROUND OF THE INVENTION

1. Field of Invention

The present invention relates to a positioning structure, and particularly to a disc positioning structure of an optical disc drive.

2. Description of the Related Art

Optical discs have advantages such as enormous memory capacity, convenience to store, long lifetime of data keeping, low price and durability of stored data. Along with such advantages, currently optical discs are gradually replacing the conventional magnetic storage medium and have become an indispensable optical storage medium for modern people.

For modern optical disc drives, in terms of the structure positioning a disc onto a disc-carrying mechanism on a turntable, there are a sliding cone positioning structure and a multi-claw positioning structure. Although the sliding cone positioning structure, in general speaking, is able to provide higher positioning accuracy, it has disadvantages of structure complexity and higher cost. Therefore, the manufacturers of optical disc drives do not prefer the sliding cone positioning structure.

FIG. 1 is an exploded diagram of a conventional disc positioning structure assembled with an optical disc, which uses a multi-claw positioning structure. Referring to FIG. 1, a disc positioning structure 100 includes a carrier plate 110, a driver 120, a spin shaft 130 and a turntable 140. The driver 120 is disposed on the carrier plate 110 while the spin shaft 130 is disposed at the center of the driver 120 for driving the turntable 140 to turn. A fixing portion 142 is disposed at the center of the turntable 140. The spin shaft 130 inserts into the fixing portion 142 of the turntable 140 to hold the turntable 140 on the driver 120. In addition, independent five locking claws 144 are disposed on the turntable for holding an optical disc 200 onto an upper surface 140a of the turntable 140 in the disc positioning structure 100.

FIG. 2 is a section view showing an optical disc held on a turntable by locking claw. Referring to FIGS. 1 and 2, the optical disc 200 is desired to hold onto the turntable 140, a circle opening 210 at the center of the optical disc 200 is aligned with the center of the turntable 140 first, then pressing down the optical disc 200 toward the turntable 140. Due to an unavoidable offset between the centerline of the circle opening at the optical disc 200 and the centerline of the turntable 140, a displacement or a deformation caused from the locking claws 144 will occur as the optical disc 200 is pressed down. After that, by means of a displacement/deformation restoring-force of the locking claws 144, the optical disc 200 is shifted to align with the centerline of the turntable 140 and snapped on the turntable 140.

In more detail, as the optical disc 200 is placed onto the turntable 140 from the top of the turntable 140, usually only on one side of the opening 210 thereof is snapped into one of the locking claws 144 first, then the following pressing makes the circle opening 210 in sequence to be snapped into the rest locking claws 144. Since a positioning deviation occurs as the circle opening 210 of the optical disc 200 is snapped into the first claw of the locking claws 144 and there are no linkage between any two locking claws in the prior art, the produced deviation of the optical disc 200 is corrected by the first locking claw 144 only. While the rest locking claws are relatively off-duty to correct the deviation of the optical disc 200, so that the positioning performance of the prior art is poor and a serious offset error between the optical disc 200 and the optical disc drive will occur. When the optical disc 200 is poorly positioned, the servo control system of the optical disc drive is likely to be out of order.

In addition, most of the locking claws 144 are fabricated by molding. Due to the inaccuracy of molding manufacture, each one of the locking claws 144 may have different manufacturing tolerance from themselves that contributes a resulted positioning error from a desired positioning accuracy.

In summary, to make a conventional disc positioning structure in multi-claw centering mode having a less positioning error, it requires a more precise manufacturing technique and needs more sampling parts to maintain the production quality. Consequently, this leads to a high production cost.

SUMMARY OF THE INVENTION

An object of the present invention is to provide a disc positioning structure to hold an optical disc with more precise positioning accuracy.

The present invention provides a disc positioning structure which includes a driver, a turntable and a positioning element. The turntable is disposed on the driver and used for holding a disc and driven by the driver. The positioning element is disposed on the turntable and the disc is clamped thereon. The positioning element has a first ring, a second ring and a plurality of spokes connected between the first ring and the second ring.

According to an embodiment of the present invention, the driver includes a spin shaft which goes through the turntable and the positioning element, while the positioning element is fixed onto the spin shaft by the second ring used as a fixing portion. Besides, the first ring and the second ring have a concentric axis and the concentric axis is the same as the spin shaft of the driver.

According to an embodiment of the present invention, the disc has an opening at the central area of the disc, used for clamping the disc onto the first ring.

According to an embodiment of the present invention, the first ring has at least a deformation portion, which would deform as a disc is clamped onto the first ring. While a deformation of the deformation portion occurs, at least two areas on the first ring would interface with the opening of the disc.

According to an embodiment of the present invention, the material of the turntable is, for example, rubber or plastic; and the manufacturing process of the first ring, the second ring and the spokes is, for example, integrated molding.

According to an embodiment of the present invention, the spokes are radially arranged.

Since the present invention employs a disc positioning structure with the function for compensating positioning error of a disc, the positioning accuracy of discs is enhanced accordingly and the eccentric spinning of an optical disc during operation of the disc driver is reduced. Besides, the present invention uses a plurality of spokes for parallel connection each other, therefore, the positioning error of a disc is compensated accordingly. All of these results in better positioning accuracy under a same manufacturing standard or a same manufacturing tolerance, so that the performance of products is enhanced and the manufacturing cost is reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

Figure 1:
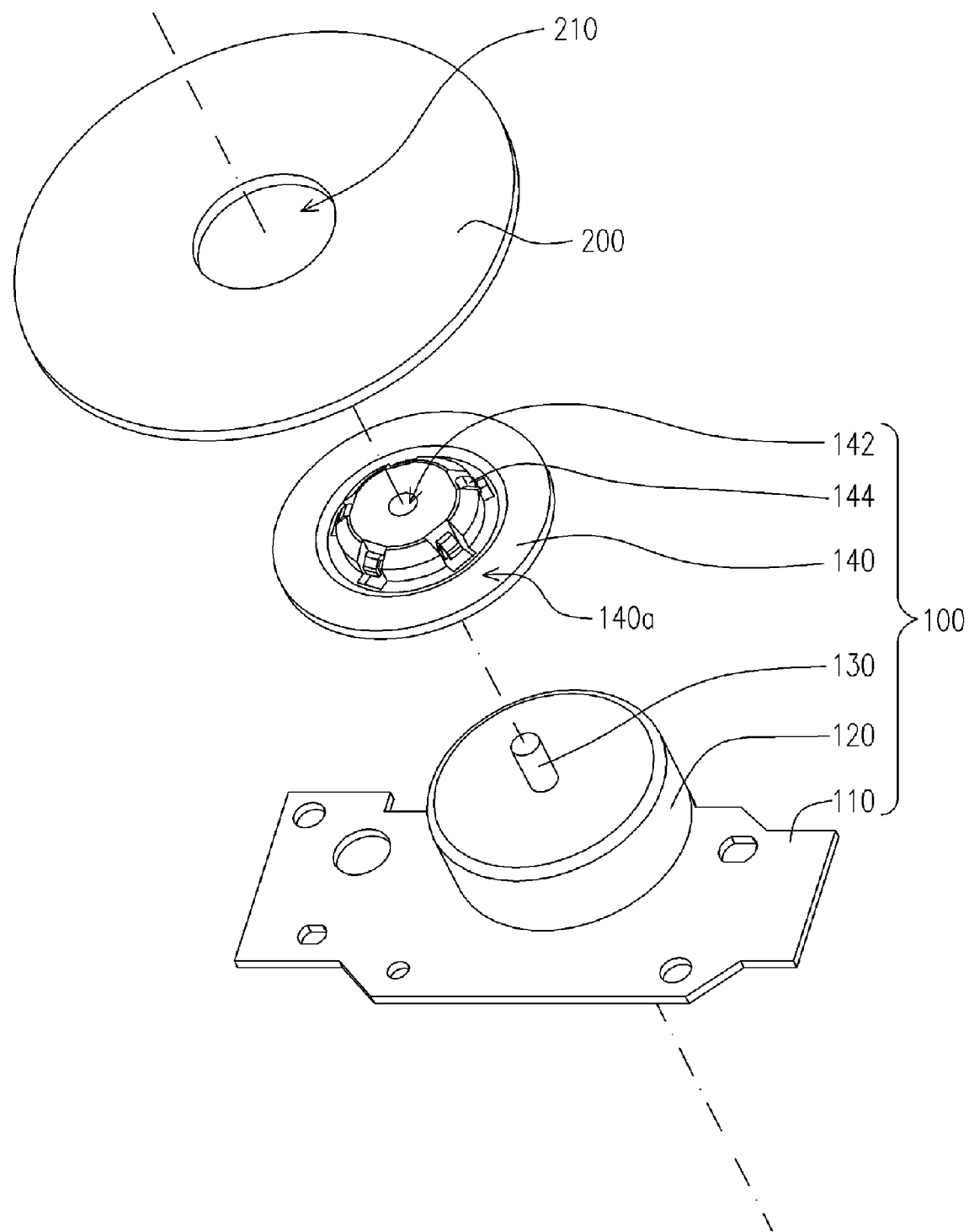
FIG. 1 is an exploded diagram of a conventional disc positioning structure with an optical disc.
Figure 2:
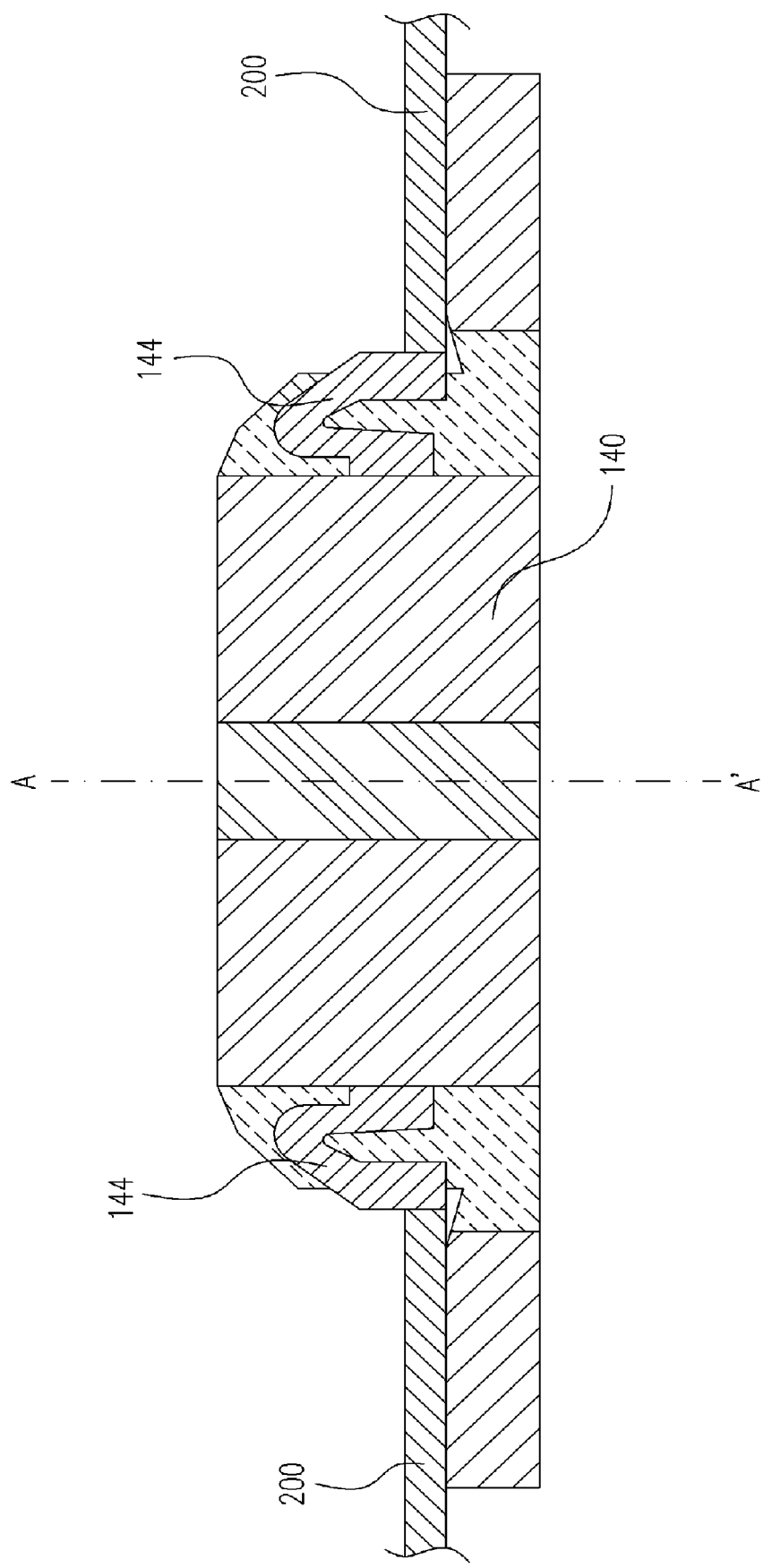
FIG. 2 is a section view showing an optical disc held on a turntable by locking claw.
Figure 3:
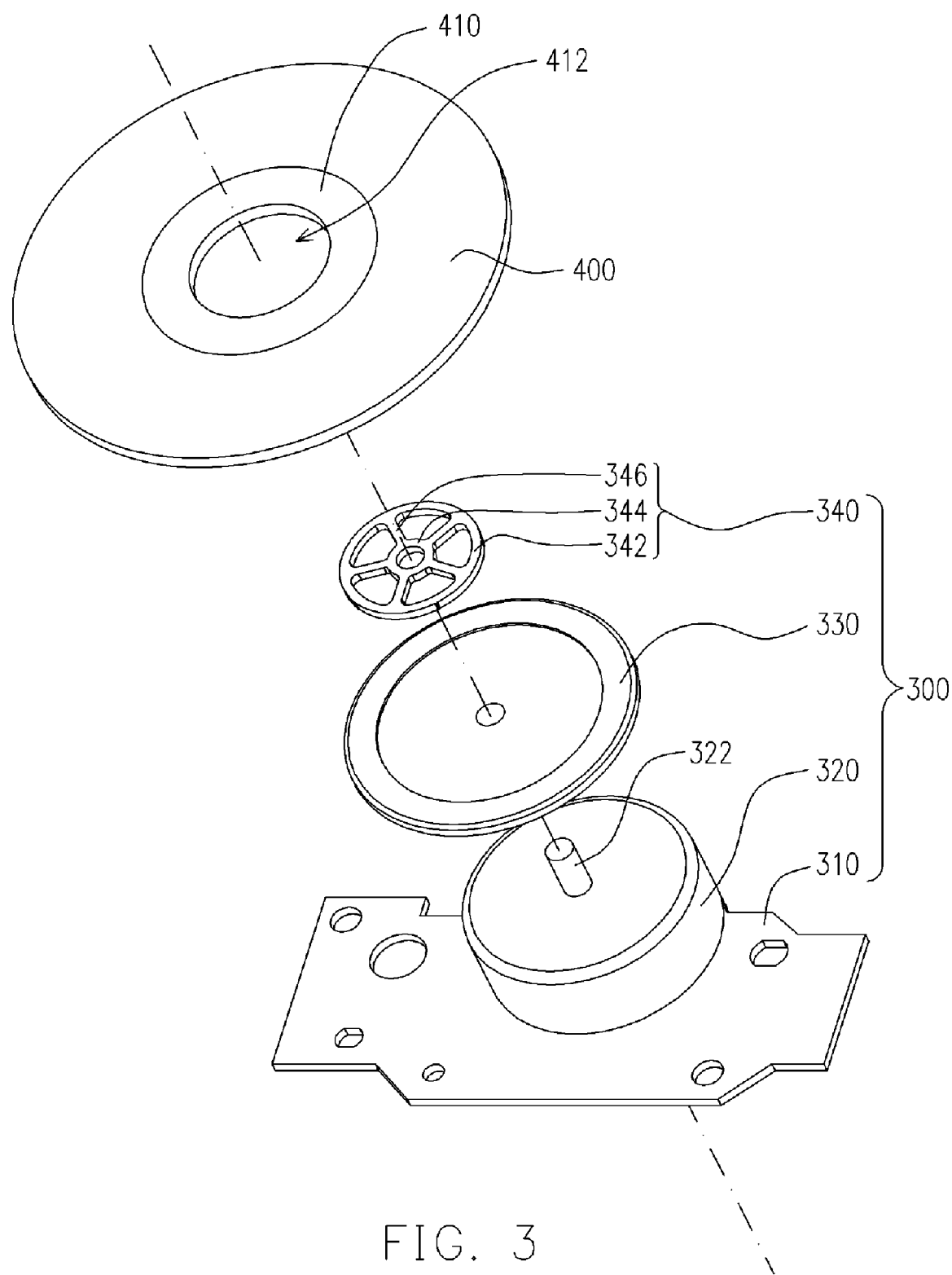
FIG. 3 is an exploded diagram of a disc positioning structure with an optical disc according to the embodiment of the present invention.

FIG. 3 is an exploded diagram of a disc positioning structure with an optical disc according to the embodiment of the present invention. Referring to FIG. 3, the disc positioning structure 300 includes a driver 320, a turntable 330 and a positioning element 340. The driver 320 is disposed, for example, on a carrier plate 310 while the turntable 330 is disposed on the driver 320 and the positioning element 340 is disposed on the turntable 330.

The positioning element 340 includes a first ring 342, a second ring 344 located inside the first ring 342 and a plurality of spokes 346 connected between the first ring 342 and the second ring 344. The first ring 342, the second ring 344 and the spokes 346 are fabricated with, for example, integrated molding. Wherein, the first ring 342 is used as a clamping portion while the second ring 344 is used as a fixing portion. The driver 320 further includes a spin shaft 322, which goes through the turntable 330 and the positioning element 340; the positioning element 340 is fixed onto the spin shaft 322 by means of the second ring 344. Besides, the centric axis of the first ring 342 and the second ring 344 is the same as that of the spin shaft 322.

Continuing to FIG. 3, a turning-fixing portion 410 is disposed at the center of the optical disc 400. The position of the turning-fixing portion 410 corresponds to the center area of the turntable 330 for placing the optical disc 400 onto the turntable 330. The turning-fixing portion 410 of the optical disc 400 is used for clamping the disc 400 onto the positioning element 340 of the disc positioning structure 300. That is, an opening 412 of the turning-fixing portion 410 is clamped onto the first ring 342 of the positioning element 340 to hold the disc 400 on the turntable 330, such that the disc 400 is further driven by the driver 320.

Remarkably, a less rigid material, i.e., a more elastic material, for example, rubber or plastic, is chosen to fabricate the positioning element 340. In the embodiment, the spokes 346 are arranged radially for connecting the first ring 342 and the second ring 344. However, the present invention should not be limited by the arrangement. The object of the present invention can be achieved as long as the arrangement of the spokes 346 is able to connect the positioning element 340 with the first ring 342 and the second ring 344.

In the present invention, an optical disc 400 is held on the disc positioning structure 300 through the positioning element 340. The advantage of the scheme is that once the optical disc 400 is held on the positioning element 340, the positioning element 340 helps the optical disc 400 to be located at a preferable position so as to make the optical disc 400 get a position compensation and reduced offset from the spin shaft in the optical disc drive. FIGS. 4A~4D are schematic top views showing a process where an optical disc is clamped onto a positioning element according to the embodiment of the present invention, by which the clamping process is explained as follows.

Figure 4A:
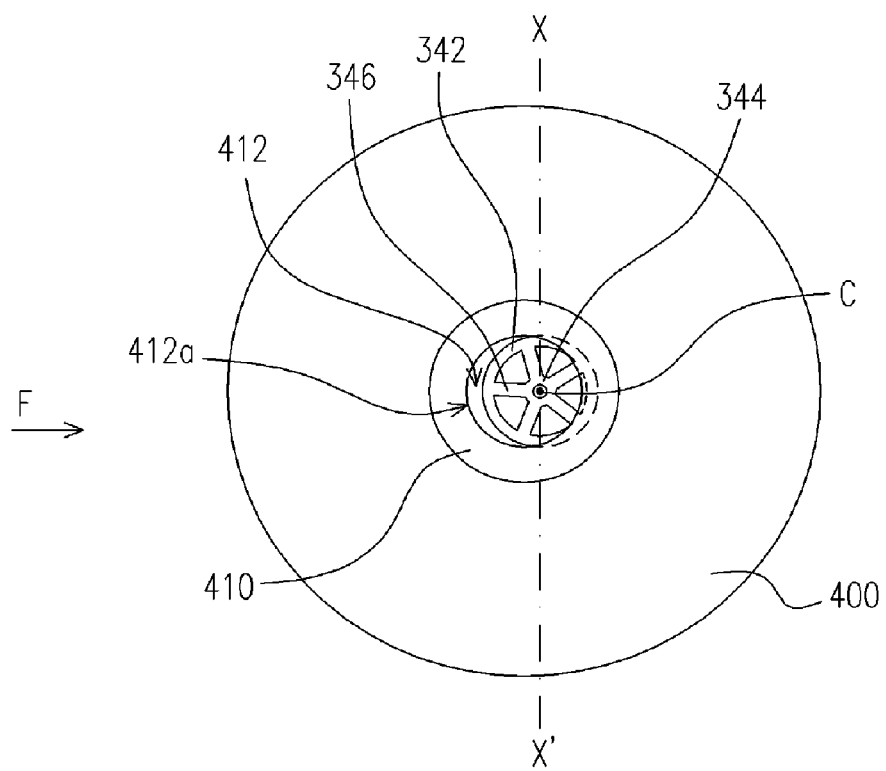
FIG. 4A~FIG. 4D are schematic top views showing a process where an optical disc is clamped onto a positioning element according to the embodiment of the present invention.
Figure 4B:
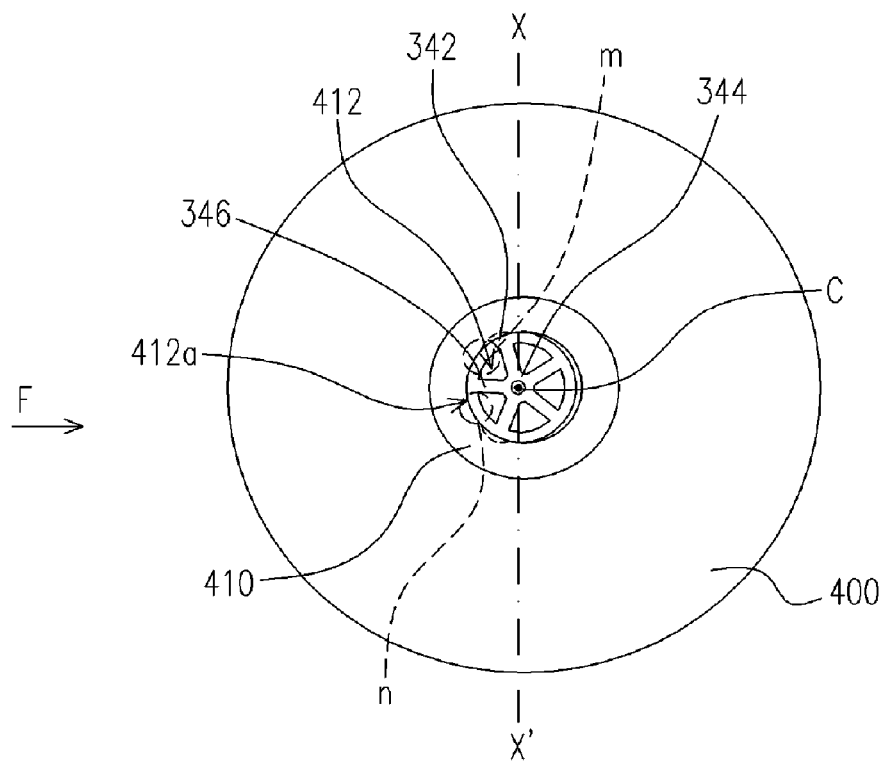

Referring to FIG. 4A, the center of the positioning element 340 resides on the axis X-X' and the optical disc 400 herein taking a little skew orientation is approaching to the positioning element 340 along the direction indicated with arrow F from left. Next, as shown in FIG. 4B, as a side wall 412a of the opening 412 at the optical disc 400 touches the first ring 342 of the positioning element 340 and the side wall 412a of the opening 412 is clamped onto a side of the first ring 342 by a further pressing down, the side of the first ring 342 and the spoke 346 would deform by a force exerted from the direction indicated with the arrow F. Besides, due to a parallel connection between the first ring 342, the second ring 344 and the spokes 346 of the turntable 340, at least the area m and the area n on the first ring 342 are consequently deformed externally, which further makes the areas m and n interfere with the opening 412 of the optical disc 400.

Figure 4C:
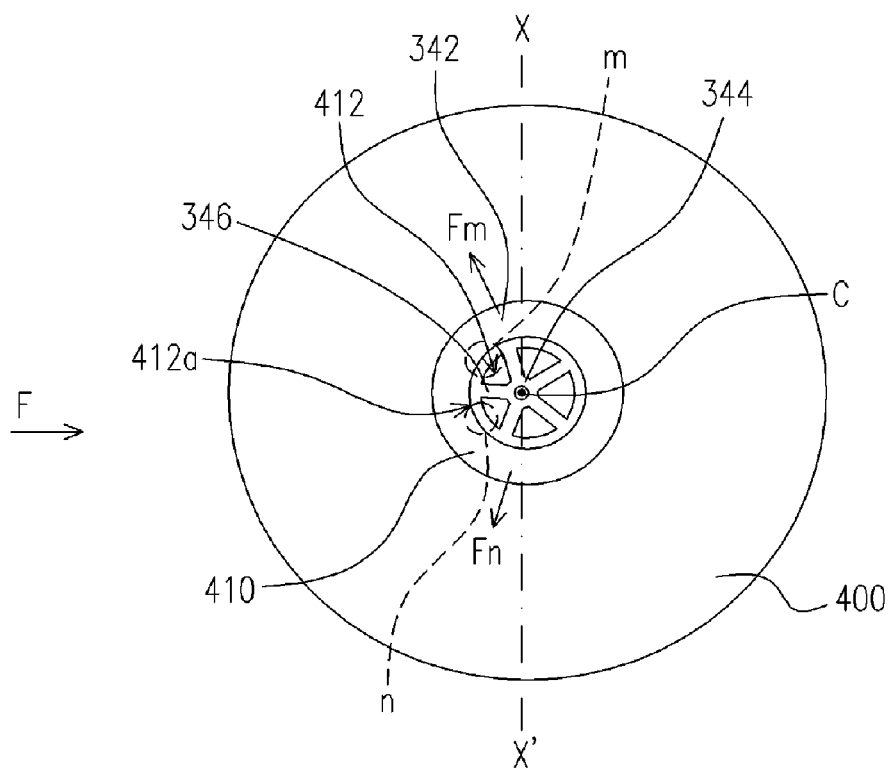

Due to the interference between the areas m and n and the opening 412 of the optical disc 400 at this point, a further pressing down the optical disc 400 enables the opening 412 to entirely be clamped onto the turntable 340, then the situation shown in FIG. 4C appears. At this point, the force coming from the direction indicated with the arrow F is not disappeared yet. Therefore, the optical disc 400 on the positioning element 340 is eccentric from the center of the positioning element 340 residing on the axis X-X'. In other words, the optical disc 400 is eccentric from the turntable 340 and the spoke 346 still is deformed with a reaction. At this point, the areas m and n of the first ring 342 are still deformed externally due to an un-released force coming from the direction indicated with the arrow F. Actions respectively coming from the directions indicated with the arrow Fm and Fn would produce reactions against the directions of the arrow Fm and Fn, respectively.

Figure 4D:
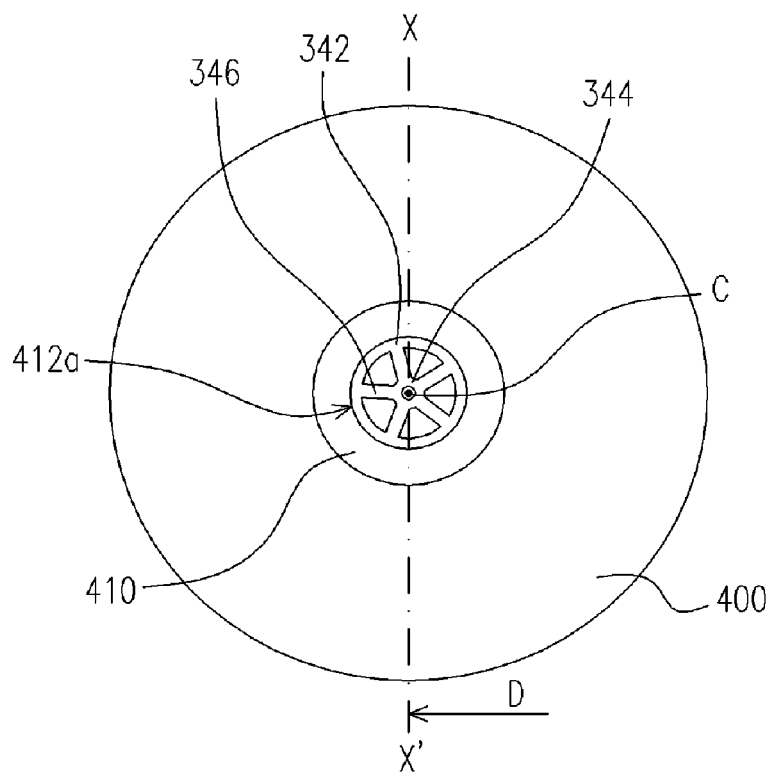

In the end, referring to FIG. 4D, as the opening 412 of the optical disc 400 has clamped onto the positioning element 340 with no press force on the optical disc 400, the force coming from the direction of the arrow F is disappeared. At this point, the spoke 346 having a reaction against the direction of the arrow F and the areas m and n having reactions against the arrow Fm and Fn, respectively, would push back the optical disc 400 towards the arrow D direction, which enables the positioning element 340 to restore the initial shape thereof; further, the center of the optical disc 400 and the center C of the positioning element 340 are concentric with each other on the axis X-X'. The above-described process finally compensates the positioning error of the optical disc 400 and reduces an eccentric spinning of the optical disc 400 during operation.

In comparison with the prior art where the locking claw on the turntable are independent from each other with no linkage, the first ring 342 and the second ring 344 of the positioning element 340 are linked through the spokes 346.

Therefore, any part of the positioning element 340 is deformed under a press of the optical disc 400, the adjacent two sides of the part are deformed therewith. Therefore, the present invention can uses the parallel connection structure of the positioning element 340 and a deformation-restoring force to push the optical disc 400 to a preferable position for compensating the positioning error. As described, the manufacture of the positioning element 340 provided by the present invention does not require a high precision technique to fabricate.

To sum up, the optical disc drive using the disc positioning structure provided by the present invention has at least the following advantages:

1. The disc positioning structure provided by the present invention compensates positioning errors of the optical disc and enables to push the optical disc after being held on the disc positioning structure to a preferable position so as to achieve a better positioning effect. Therefore, the present invention enhances the positioning accuracy of optical discs and reduces the eccentric spinning during operation.

2. The disc positioning structure provided by the present invention is simple in structure that the manufacturing process does not require a high precision technique to fabricate parts. Therefore, the present invention reduces the production cost.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:

1. A disc positioning structure, comprising:
   a driver;
   a turntable disposed on the driver, used for placing a disc and is driven by the driver to spin; and
   a positioning element disposed on the turntable, wherein the disc is clamped onto the positioning element, the positioning element comprises a first ring, a second ring and a plurality of spokes, the second ring resides inside the first ring and the plurality of spokes resides between the first ring and the second ring,
   wherein, the first ring has at least a deformation portion and the deformation portion produces deformation as the disc is clamped on the first ring,
   wherein, as the deformation portion produces deformation, at least two areas on the first ring interfere with an opening of the disc.

2. The disc positioning structure of claim 1, wherein the disc has an opening at the central area of the disc and the first ring is used as a clamping portion to clamp the opening.

3. The disc positioning structure of claim 1, wherein the driver comprises a spin shaft, the spin shaft goes through the turntable and the positioning element while the second ring is used as a fixing portion fixed on the spin shaft.

4. The disc positioning structure of claim 1, wherein the material of the positioning element is rubber or plastic.

5. The disc positioning structure of claim 1, wherein the first ring, the second ring and the spokes are fabricated in integrated molding.

6. The disc positioning structure of claim 1, wherein the spokes are radially arranged.

7. The disc positioning structure of claim 3, wherein the first ring and the second ring have a concentric axis the same as the axis of the spin shaft.

* * * * *